United States Patent Office 3,549,321
Patented Dec. 22, 1970

3,549,321
REMOVAL OF IRON FROM SOLUTION
Peter Kenneth Everett, Toronto, Ontario, Canada, assignor to Union Carbide Canada Limited, Toronto, Ontario, Canada, a company of Canada
No Drawing. Filed Apr. 25, 1968, Ser. No. 724,291
Int. Cl. C01g *49/02*
U.S. Cl. 23—200                              7 Claims

ABSTRACT OF THE DISCLOSURE

Iron is removed from an aqueous solution such as an ore leaching solution by precipitating the iron as hydrated ferric oxide. The iron in solution is converted to ferrous ion and the pH adjusted to between 2.0 and 5.0. The ferrous ions are adsorbed on particles of manganese dioxide and subsequently oxidized in accordance with the equation:

$$2Fe^{++} + MnO_2 + 2H_2O \rightarrow Fe_2O_3 \cdot H_2O + Mn^{++} + 2H$$

The resulting ferric oxide and unreacted manganese dioxide are easily removed from solution.

---

This invention relates to the removal of iron from solution, more particularly to the removal of iron from leaching solutions obtained in the leaching of ores.

Iron is usually removed from leaching solutions by precipitation as hydrated ferric oxide at a pH of about 3.0 or above.

$$2Fe^{+++} + (3+x)H_2O \rightarrow Fe_2O_3 \cdot xH_2O + 6H^+$$

Any ferrous ion present initially, is normally oxidized to ferric ion before the pH is raised. The hydrated ferric oxide or hydroxide, is very slimy and extremely difficult to filter. It is also extremely difficult to wash and, as a result, losses can be high due to various metal values being lost in the filter cake. If a solid alkali is used to raise the pH, losses can occur due to the occlusion of unreacted alkali particles in the ferric hydroxide precipitate.

It is an object of this invention to provide a process whereby iron can be removed from solutions in a simple and inexpensive manner.

It is a further object of the invention to provide a process whereby iron is removed from ore leaches in a readily separable form.

The present invention consists of an improved process for removing iron from an aqueous solution which comprises adsorbing iron in the form of ferrous ion on particles of manganese dioxide, where it is oxidized to ferric oxide to form a residue which is easily separable from the solution.

The adsorption and subsequent oxidation of the ferrous ion to hydrated ferric oxide is carried out at a pH greater than about 2.0. In order to carry out the process of the present invention all iron in the starting solution should be in the ferrous state. Ferric ion will not be adsorbed and will precipitate as hydrated ferric oxide if the pH is raised above 3.0. Since the oxidation of the iron occurs on the surface of the manganese dioxide the residue from the solution consists of ferric oxide-manganese dioxide. The pH of the solution should be maintained above 2 throughout the iron separation process otherwise some of the ferric oxide may react with hydrogen ion and go into solution as ferric ion.

Conversion of all iron in solution to ferrous ion may be accomplished by adding a reducing agent such as a metal sulfide. When using zinc sulfide for example the reaction would be as follows:

$$ZnS + 2Fe^{+++} \rightarrow Zn^{++} + S^\circ + 2Fe^{++}$$

The pH of the solution is then adjusted to between 2 and about 5 using an alkali such as CaO, $CaCO_3$, ZnO, $ZnCO_3$, MnO, MnOH, KOH, and $MnCO_3$. If the pH of the solution is raised much above 5, the ferrous ions may separate out of solution as $Fe(OH)_2$. Also if the solution contains other ions, from the leaching of ore for example, these might also precipitate as hydroxides at a pH of about 5.0. By an upper limit of pH about 5.0 is meant the pH at which the ferrous ions or other ore metals such as zinc and cadmium form hydroxides.

Since an excess of manganese dioxide is usually used in this process, the reaction residue will consist of ferric oxide-manganese dioxide. This residue is filtered from solution and may then be washed with mineral acid to take up the iron as a ferric ion solution. The manganese dioxide may be recovered for future use. An alternative is to react the ferric-oxide-manganese dioxide with an excess of ferrous ions in solution until essentially all the $MnO_2$ has been converted to $Mn^{++}$ with a corresponding conversion of ferrous ion to $Fe_2O_3$, provided that the pH of the ferrous ion solution is above 2.0. It must be appreciated however that since the surface of this manganese dioxide may be saturated with ferric oxide the rate of adsorption of additional ferrous ion and subsequent oxidation will be slow. The residue from this reaction will contain little unreacted manganese dioxide. This process as easily adaptable to a counter-current system wherein fresh manganese dioxide is introduced into one end of a reaction medium and fresh ferrous ion solution is added to the other.

In the present invention the process is believed to occur as follows:

(a) Adsorption of ferrous ion on the $MnO_2$ surface $$2Fe^{++} + MnO_2 \rightarrow MnO_2 - (2Fe^{++})$$

(b) Reaction involving oxidation of the ferrous ion and liberation of $Mn^{++}$.

$$MnO_2 - (2Fe^{++}) + H_2O \rightarrow Fe_2O_3 + Mn^{++} + 2H^+$$

(c) Liberation of ferric ion with the consumption of $H^+$.

$$Fe_2O_3 + 6H^+ \rightarrow 2Fe^{+++} + 3H_2O$$

In the process described above approximately two-thirds of oxygen for producing the ferric oxide comes from the manganese dioxide with the generation of only one equivalent of acid for each equivalent of ferrous ion. In the reaction of the prior art wherein iron is removed directly in the ferric state as hydrated ferric oxide, three equivalents of acid is generated for each equivalent of ferric iron. Less neutralizer is therefore required in the present reaction to adjust to pH.

The manganese dioxide particles used in this invention should be of a mesh size between 50 and 300 mesh. For efficient operations a particle size between 100 and 300 mesh is preferred. Since small particles provide a larger iron adsorbing surface area per given weight of manganese dioxide than larger particles, more efficient operation is achieved with particle sizes around 300 mesh. The particles should be kept in suspension by mechanical stirring or other means so that as much manganese dioxide surface area is available for adsorption as possible. Although particles of a size as small as 300 mesh can be used, particles of too fine a mesh would interfere with the filtration of the residue.

Example I

A 0.035 molar aqueous ferrous sulphate solution was prepared and the pH adjusted to 4.7. The solution was heated to 85° C. and 50 gms. per liter of manganese dioxide particles of a mesh size between 100 and 200 mesh were added to the solution. The pH as well as the respective concentrations of ferrous ion and manganese ion were measured at certain time intervals. The results are indicated in Table I.

TABLE I

| Time (mins.) | 0 | 2 | 15 | 50 | 75 |
|---|---|---|---|---|---|
| pH | 4.7 | 3.1 | 2.8 | 2.75 | 2.70 |
| Total Fe++ (millimolar) | 36.0 | 9.3 | 0.9 | 0.7 | 0.8 |
| Total Mn++ (millimolar) | 0 | 6.4 | 11.3 | 13.2 | 16.6 |

It can be seen from the above table that there was an appreciable time lag between adsorption and subsequent oxidation on the surface of the manganese dioxide which liberates $Mn^{++}$ and $H^+$ ions. Thus, after 2 minutes, 26.7 mm. (36.0—9.3) was removed from solution and only 6.4 mm. $Mn^{++}$ was liberated, whereas from the overall equation the ratio of iron adsorbed to $Mn^{++}$ liberated should be 2:1.

In the above experiment the oxidized iron separated easily in the black, granular residue of manganese dioxide. There was no apparent formation of the red-brown form of hydrated ferric oxide that is usually obtained when iron is removed directly from solution as the hydrated ferric oxide. The black granular residue contained a considerable amount of $MnO_2$ since an excess of $MnO_2$ was used in this reaction. The residue was treated with 0.1 M sulphuric acid of the same volume as the original ferrous solution at 88° C. leaving manganese dioxide which could be used in a repeated process.

The composition of the acid solution was determined over a 30 minute period. The results are shown in Table II.

TABLE II

| Time (mins.) | 0 | 2 | 6 | 30 |
|---|---|---|---|---|
| Total Fe+++ (millimolar) | 0 | 32 | 34 | 34 |
| Total Mn++ (millimolar) | 0 | 1.5 | 2.2 | 2.4 |

It can be seen from the above table that the iron was substantially completely desorbed in 2 minutes in the acid bath.

The example given above describes a process of iron removal where a large excess of manganese dioxide is used. This excess results in relatively fast iron removal since a large surface area of manganese dioxide is available for ready adsorption of ferrous ions. At the end of the reaction the ferric oxide hydrate-manganese dioxide residue was filtered and washed with mineral acid to dissolve the iron.

In cases where it is desirable to avoid the production of ferric solution and eliminate the cost of mineral acid necessary for its solution, it is possible to convert the black ferric oxide-manganese dioxide residue to one containing very little manganese dioxide by further reaction of this residue with additional ferrous ion. In this particular situation the reaction proceeded with a large excess of ferrous ion. While conversion is relatively slow, substantially all of the manganese dioxide was converted to $Mn^{++}$ with corresponding conversion of ferrous ion to ferric oxide. The red ferric oxide residue resulting from this additional reaction was washed free of impurities.

Example II

A 0.05 molar aqueous ferrous sulphate solution was prepared and the pH adjusted to 4.5. The solution was heated to 95° C. and 2.5 gms. per liter of manganese dioxide particles of approximately 300 mesh size were added to the solution. The conversion of ferrous ion to ferric oxide was determined at intervals. The results are shown in the following table:

TABLE III

| Time (hours): | Percent conversion |
|---|---|
| 2 | 59 |
| 5 | 78 |
| 10 | 93 |
| 20 | 95 |
| 30 | 96 |

The final product after 30 hours analysed as 1.5% Mn and 96% iron calculated as $Fe_2O_3$.

Example I, illustrates the effective iron removal by the fast surface reaction of manganese dioxide with ferrous ion. Example II, illustrates a slower but essentially complete, conversion of $MnO_2$ to Mn ion with excess ferrous ions. In one embodiment of this invention both reactions can be carried out by counter-current contacting wherein the inlet solution has an excess of ferrous ions thus assisting in the complete conversion of manganese dioxide to $Mn^{++}$, and the outlet solution is contacted with fresh manganese dioxide to substantially complete removal of iron from solution as hydrated ferric oxide.

Another embodiment utilizes the difference in particle size between the manganese dioxide and the ferric oxide produced. During the oxidation of the iron gradual attrition of the manganese dioxide particles takes place. It was found that manganese dioxide particles having the smallest particles size and slowest settling velocity have the highest iron and lowest manganese content. Thus in a fluidized reaction bed of manganese dioxide, the completely reacted particles accumulate at the top, providing an easy method of separation with fresh manganese dioxide being added at the base of the bed.

The process of this invention may be carried out at temperatures as low as 20° C. but is preferably carried out above 50° C. up to the boiling point of the solution. This process is particularly suitable for removing iron from solution containing other metal ions such as zinc, cadmium and manganese.

I claim:
1. A process for removing iron from an aqueous solution which comprises:
    (a) adjusting the pH of an aqueous solution containing iron in the form of ferrous ions to between 2.0 and 5.0;
    (b) adding an excess of manganese dioxide particles to the solution;
    (c) adsorbing ferrous ions on particles of the manganese dioxide while maintaining the temperature of the solution between 20° C. and 100° C.;
    (d) oxidizing the adsorbed ferrous ions to hydrated ferric oxide in accordance with the equation:

$$2Fe^{++} + MnO_2 + 2H_2O \rightarrow Fe_2O_3 \cdot H_2O + Mn^{++} + 2H^+$$

(e) and removing the resulting hydrated ferric oxide and unreacted manganese dioxide from solution as a black granular precipitate.

2. A process for removing iron from an aqueous solution which comprises:
    (a) converting iron in an aqueous solution to ferrous ion and then adjusting the pH of the solution to between 2.0 and 5.0;
    (b) raising the temperature of the solution to between 50° C. and 100° C. and adding an excess of manganese dioxide particles having a mesh size between 50 and 300 mesh to the solution;
    (c) adsorbing ferrous ions on particles of manganese dioxide;
    (d) oxidizing the adsorbed ferrous ions to hydrated ferric oxide in accordance with the equation:

$$2Fe^{++} + MnO_2 + 2H_2O \rightarrow Fe_2O_3 \cdot H_2O + Mn^{++} + 2H^+$$

(e) and removing the resulting hydrated ferric oxide and unreacted manganese dioxide from solution as a black granular precipitate.

3. In a process for removing iron from an aqueous solution wherein the iron is precipitated as ferric oxide, the improvement comprising:
    converting the iron in solution to ferrous ion and adjusting the pH of the solution to between 2.0 and 5.0; heating the solution to a temperature between 50° C. and 95° C. and adding an excess of manganese dioxide particles having a mesh size between 100 mesh and 300 mesh to the solution; adsorbing ferrous ions on particles of the manganese dioxide; oxidizing the adsorbed ferrous ions to hydrated ferric oxide in accordance with the equation:

$$2Fe^{++} + MnO_2 + 2H_2O \rightarrow Fe_2O_3 \cdot H_2O + Mn^{++} + 2H^+$$

and then removing the resulting ferric oxide and unreacted manganese dioxide from solution, said ferric oxide being a black granular precipitate.

4. A process as claimed in claim 1 wherein the temperature of the solution is raised to between 50° C. and 100° C. and said solution is agitated prior to separation of the ferric oxide and manganese dioxide.

5. A process as claimed in claim 2 wherein the ferric oxide removed from solution is separated from the manganese dioxide by dissolving the ferric oxide in a mineral acid solution and filtering the manganese dioxide from said solution.

6. A process as claimed in claim 2 wherein the temperature of the solution is raised to between 50° C. and 95° C. and said solution is agitated after the addition of the manganese dioxide particles and prior to the removal of the resulting ferric oxide and unreacted manganese dioxide.

7. A process as claimed in claim 6 wherein the solution is an ore leaching solution containing iron and at least one metal selected from the group consisting of zinc, cadmium and manganese.

References Cited

UNITED STATES PATENTS

| 33,574 | 10/1861 | Cook | 23—200X |
|---|---|---|---|
| 1,269,442 | 6/1918 | Hoffman | 23—200 |
| 1,368,748 | 2/1921 | Penniman et al. | 23—200 |
| 1,606,470 | 11/1926 | Grant et al. | 23—126 |
| 2,462,499 | 2/1949 | Hoak | 23—200X |

FOREIGN PATENTS

| 212,000 | 4/1956 | Australia | 23—145 |
|---|---|---|---|
| 290,421 | 5/1928 | Great Britain | 23—200 |

EARL C. THOMAS, Primary Examiner

U.S. Cl. X.R.

75—108